US008149994B2

(12) United States Patent
Yoon et al.

(10) Patent No.: US 8,149,994 B2
(45) Date of Patent: Apr. 3, 2012

(54) ELECTRONIC SURVEILLANCE SYSTEM IN COMMUNICATION NETWORK AND METHOD THEREOF

(75) Inventors: Byung-Sik Yoon, Daejeon (KR); Song-In Choi, Daejeon (KR); Jee-Hwan Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1335 days.

(21) Appl. No.: 11/759,893

(22) Filed: Jun. 7, 2007

(65) Prior Publication Data

US 2008/0137825 A1   Jun. 12, 2008

(30) Foreign Application Priority Data

Dec. 8, 2006   (KR) .................. 10-2006-0124487

(51) Int. Cl.
- *H04M 1/24* (2006.01)
- *H04M 3/08* (2006.01)
- *H04M 3/22* (2006.01)
- *H04M 15/00* (2006.01)

(52) U.S. Cl. ............. 379/32.03; 379/32.01; 379/112.01; 379/133; 379/136

(58) Field of Classification Search ............... 379/92.03, 379/93.01, 93.17, 93.23, 100.05, 100.06, 379/100.12, 100.17, 112.01, 112.06, 112.08, 379/126, 133, 134, 136, 139, 32.01, 32.03
See application file for complete search history.

(56) References Cited

U.S. PATENT DOCUMENTS

| | | | |
|---|---|---|---|
| 6,233,313 B1 * | 5/2001 | Farris et al. | 379/112.01 |
| 6,504,907 B1 * | 1/2003 | Farris et al. | 379/35 |
| 7,587,757 B2 * | 9/2009 | Scoggins et al. | 726/11 |
| 2003/0078041 A1 * | 4/2003 | Dikmen et al. | 455/433 |
| 2003/0108182 A1 * | 6/2003 | Dikmen | 379/229 |
| 2004/0179513 A1 * | 9/2004 | Smith et al. | 370/352 |
| 2004/0202295 A1 | 10/2004 | Shen et al. | |
| 2004/0213388 A1 * | 10/2004 | Mow | 379/106.02 |
| 2004/0255126 A1 | 12/2004 | Reith | |
| 2005/0094773 A1 * | 5/2005 | Peterson | 379/35 |
| 2005/0180446 A1 * | 8/2005 | Flowers et al. | 370/428 |
| 2007/0211639 A1 * | 9/2007 | Spalt | 370/241 |

* cited by examiner

Primary Examiner — Binh Tieu

(57) ABSTRACT

Provided are an electronic surveillance system and a method thereof. In the electronic surveillance system that performs electronic surveillance on a subscriber in a communication network, the electronic surveillance system includes: one or more communication service providers that provide retained data, which is information generated while the subscriber uses a communication service; a dedicated storage that stores and manages the retained data provided by the communication service providers; and a law enforcement agency that requests the dedicated storage to send electronic surveillance information on a specific subscriber so as to be provided with the surveillance information when the electronic surveillance information on the specific subscriber is required. Accordingly, retained data, which is subscriber electronic surveillance information is integrally managed and stored in a dedicated storage. Thus, a communication service provider can reduce costs when a law enforcement agency requests subscriber electronic surveillance information. Furthermore, the subscriber electronic surveillance information can be efficiently managed.

10 Claims, 8 Drawing Sheets

ELECTRONIC SURVEILLANCE SYSTEM IN COMMUNICATION NETWORK AND METHOD THEREOF

CROSS-REFERENCE TO RELATED APPLICATION

This application claims priority to and the benefit of Korean Patent Application No. 10-2006-0124487 filed in the Korean Intellectual Property Office on Dec. 8, 2006, the entire contents of which are incorporated herein by reference.

BACKGROUND OF THE INVENTION (a) Field of the Invention The present invention relates to an electronic surveillance system in a communication network and a method thereof, and more particularly, to a system that provides retained data handover between a communication service provider and a law enforcement agency.

(b) Description of the Related Art

Electronic surveillance is a technique by which a communication network provider or a communication network service provider provides subscriber-related information, such as access information on a specific subscriber and telephone call information, when a law enforcement agency legally requests communication electronic surveillance (including audio and data).

Such electronic surveillance is different from the conventional communication system that uses a simple wire tapping structure. Therefore, with the steady development of network technology, the conventional wire tapping device that has been independently operated by the law enforcement agency cannot be efficiently used. These days there is a need for dealing with various crimes, on a real-time basis, that may harm public safety such as terrorism, e-commerce crime, and hacking. Therefore, a new communication electronic surveillance system that employs a normalized standard and structure is required to prevent illegal interception.

In the U.S., in a wired/wireless communication system, electronic surveillance is achieved based on the Communications Assistance for Law Enforcement Act (CALEA) passed by the U.S. Congress in 1994. Under the CALEA, all communication providers or communication device manufacturers have to respond to a legal electronic surveillance request of a law enforcement agency and have to conform to the standard. In Europe, the Europe Parliament properly uses details on cyber-crime in consideration of the situation of each country. A lawful interception (hereinafter referred to as "L.I.") sector within the European Telecommunication Standard Institute (ETSI) enacts a communication electronic surveillance standard suitable for European telecommunication systems.

FIG. 1 is a schematic diagram illustrating a structure of a general L.I. system used in a standardization organization.

Referring to FIG. 1, the general L.I. system may be roughly classified into two parts, as shown in FIG. 1, which are a communication service provider that provides various communication services and a law enforcement agency (LEA).

The general L.I. system includes five small modules. An L.I. administration function, a mediation device, and a collection function are provided specifically only for electronic surveillance. An intercepting control element (ICE) and an intercepting network element (INE) are functions that have to be additionally installed in the conventional communication equipment.

The mediation device efficiently deals with each interface for various communication systems and various LEAs.

The operation of the general L.I. system will now be described.

First, an LEA requests a communication service provider to perform electronic surveillance on a specific subscriber. Then, the L.I. administration function allows a command for performing electronic surveillance to be transmitted to the ICE and the INE via the mediation device.

Next, the ICE collects intercept related information (IRI), that is, subscriber information such as subscriber access information, subscriber identification (ID), subscriber access time, and access information of a second subscriber who is communicating with the first subscriber. The INE collects communication content (CC) communicated by the subscriber in practice.

Next, the communication service provider transmits the subscriber information and the CC respectively collected by the ICE and the INE to the collection function via the mediation device. The LEA that receives the information analyzes the information to perform law enforcement.

FIG. 2 is a schematic diagram illustrating a handover structure of the conventional retained data.

Retained data is electronic surveillance information on a specific subscriber provided by communication service providers at the request of the LEA. The communication service providers are obligated to store the retained data for a specific period of time even after the retained data is transmitted to the LEA so that the stored retained data is retransmitted immediately after the LEA requests the retained data.

At present, the requirement and standard related to the retained data handover are under deliberation by the L.I. group within the ETSI, and the standard is expected to be standardized at some point.

Referring to FIG. 2, an LEA 250 requests a communication service provider 210 to send electronic surveillance information on a specific subscriber through a handover interface A (HI-A). Then, the communication service provider 210 responds to the request through the HI-A interface and provides the electronic surveillance information to the LEA 250 through a handover interface B (HI-B).

Here, the HI-A interface is a standard in association with a procedure in which the LEA 250 requests the communication service provider 210 to send the communication electronic surveillance information, and the communication service provider 210 responds to the request. The HI-B is a standard in association with a procedure in which the electronic surveillance information requested by the LEA 250 is transmitted from a database that stores the electronic surveillance information to the LEA 250.

FIG. 3 is a schematic view illustrating a handover structure of retained data between a plurality of communication service providers and an LEA.

Referring to FIG. 3, the LEA requests the plurality of communication service providers to send electronic surveillance information on a subscriber. After receiving the request, the plurality of communication service providers each provide electronic surveillance information to the LEA.

This method has a problem in that a communication service provider has to pay for additional costs since a large amount of information has to be stored, preserved, and managed for a specific time period at the expense of the communication service provider.

In addition, since the plurality of communication service providers each manage the subscriber electronic surveillance information, efficiency of surveillance information management deteriorates.

In addition, small-sized communication providers or Internet service providers (ISPs) may not have such equipment. In this case, a communication service business may face a restriction, which may result in severe opposition of the small-sized communication providers.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an electronic surveillance system in a communication network and a method thereof having advantages of providing retained data handover between a communication service provider and a law enforcement agency. An exemplary embodiment of the present invention provides an electronic surveillance system in a communication network and a method thereof. Another embodiment of the present invention provides a system that can reduce a communication service provider's cost produced when a law enforcement agency requests subscriber electronic surveillance information and that can efficiently manage the subscriber electronic surveillance information, and a method thereof.

According to an embodiment of the present invention, there is provided an electronic surveillance system that performs electronic surveillance on a subscriber in a communication network, the system including: one or more communication service providers that provide retained data, which is information generated while the subscriber uses a communication service; a dedicated storage that stores and manages the retained data provided by the communication service providers; and a law enforcement agency that requests the dedicated storage to send electronic surveillance information on a specific subscriber so as to be provided with the surveillance information when the electronic surveillance information on the specific subscriber is required.

According to another embodiment of the present invention, there is provided an electronic surveillance method that performs electronic surveillance on a subscriber in a communication network, the method including steps of: storing retained data, which is electronic surveillance information on the subscriber; searching for the electronic surveillance information on the specific subscriber from the retained data if there is a request for the electronic surveillance information on the specific subscriber; and providing the found electronic surveillance information on the specific subscriber.

According to still another embodiment of the present invention, there is provided an electronic surveillance system that performs electronic surveillance on a subscriber in a communication network, the system including: one or more communication service providers that provide retained data, which is information generated while the subscriber uses a communication service; a law enforcement agency that receives the retained data from the communication service providers to analyze and classify the retained data; and a dedicated storage that stores and manages the retained data classified by the law enforcement agency, wherein the law enforcement agency requests surveillance information on a specific subscriber so as to be provided with the surveillance information when the surveillance information on the specific subscriber is required.

According to yet another embodiment of the present invention, there is provided an electronic surveillance method that performs electronic surveillance on a subscriber in a communication network, the method including steps of: classifying retained data by analyzing the retained data, which is electronic surveillance information on the subscriber; storing the retained data; searching for the required retained data if there is a request for the electronic surveillance on the specific subscriber; and providing the found electronic surveillance information on the specific subscriber.

DETAILED DESCRIPTION OF THE EMBODIMENTS

Figure 1:
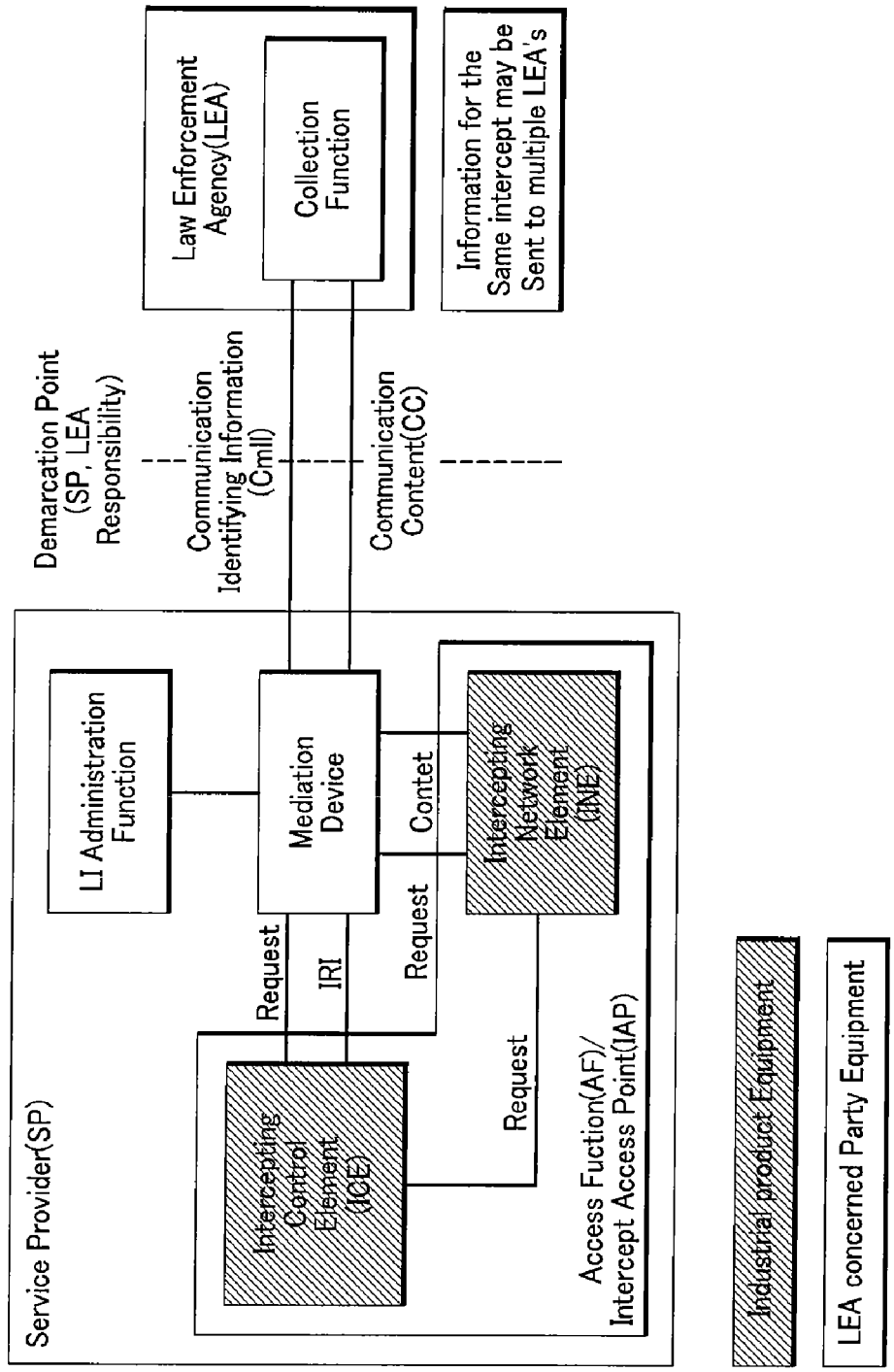
FIG. 1 is a schematic diagram illustrating a structure of a general legal interception system used by a standardization organization.
Figure 2:
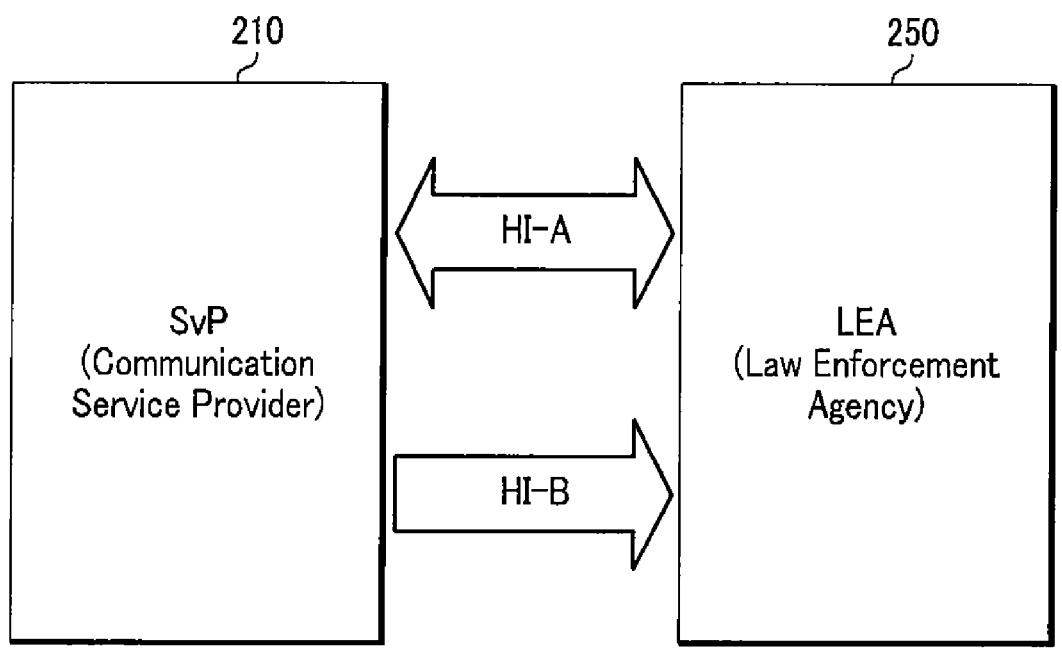
FIG. 2 is a schematic diagram illustrating a handover structure of the conventional retained data.
Figure 3:
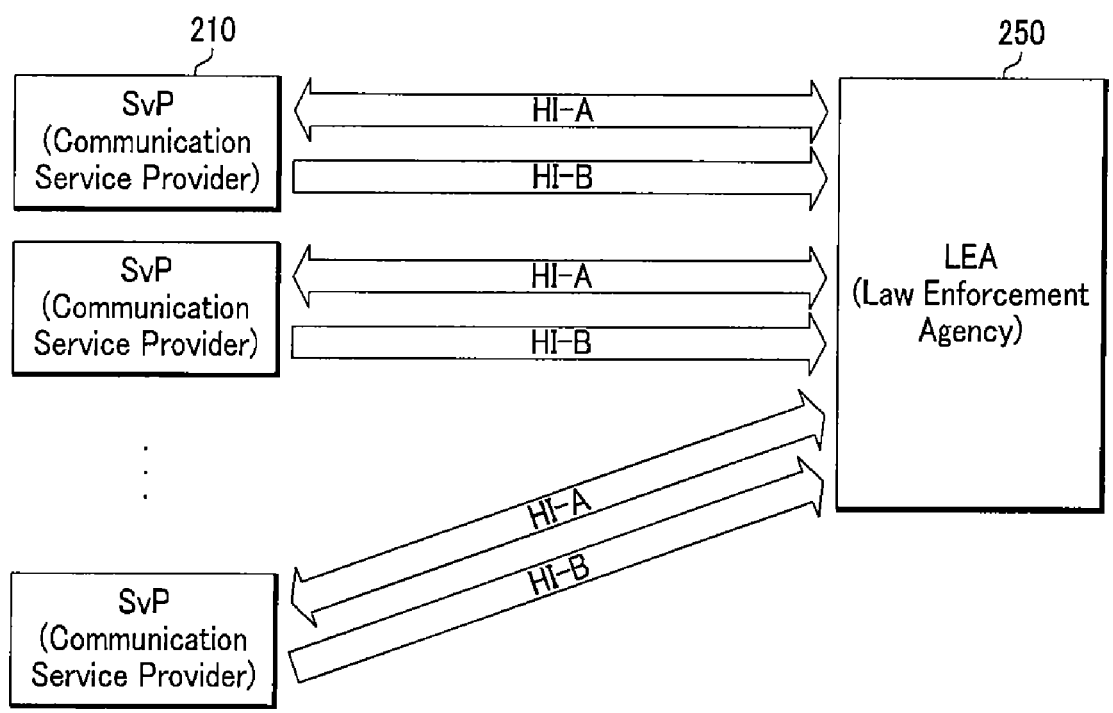
FIG. 3 is a schematic view illustrating a handover structure of retained data between a plurality of communication service providers and a law enforcement agency (LEA).

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless otherwise defined, when a term "includes" is used to describe a component has certain constituent elements, other constituent elements are not particularly limited, and thus one or more constituent elements may be further included.

Figure 4:
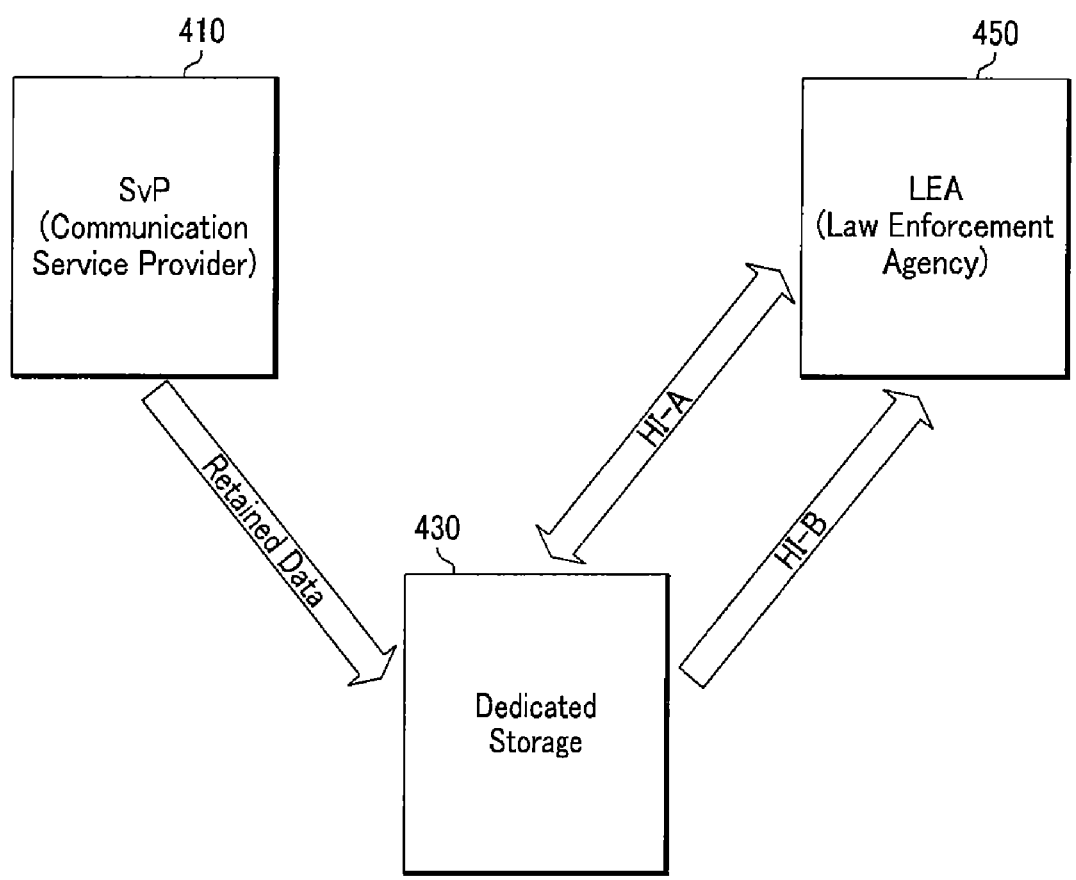
FIG. 4 is a schematic view illustrating a handover structure of retained data between a communication service provider and an LEA in an electronic surveillance system according to an embodiment of the present invention.
Figure 5:
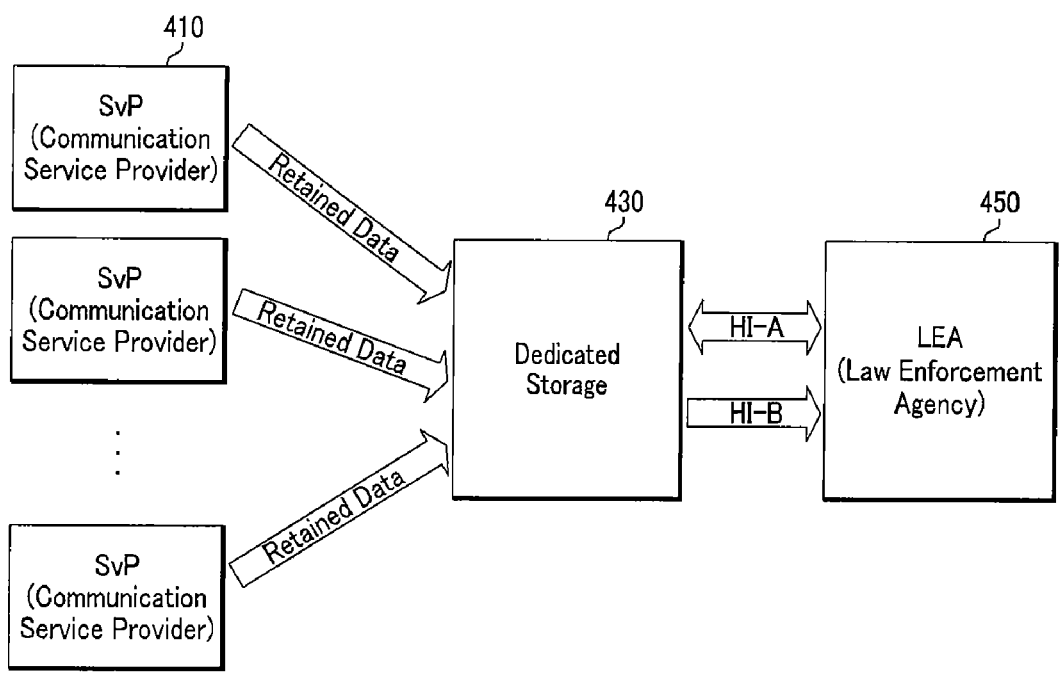
FIG. 5 is a schematic view illustrating a handover structure of retained data between a plurality of communication service providers and an LEA in an electronic surveillance system according to a first exemplary embodiment of the present invention.

FIG. 4 is a schematic view illustrating a handover structure of retained data between a communication service provider and a law enforcement agency (LEA) in an electronic surveillance system according to an embodiment of the present invention, and FIG. 5 is a schematic view illustrating a handover structure of retained data between a plurality of communication service providers and an LEA in an electronic surveillance system according to a first exemplary embodiment of the present invention. Here, FIG. 5 shows an extended concept of the structure of FIG. 4.

The retained data is electronic surveillance information on a specific subscriber provided by the communication service providers at the request of the LEA. The retained data includes subscriber information such as subscriber access information and telephone call information. In addition, the communication service providers are obligated to store the retained data for a specific period of time even after the retained data is transmitted to the LEA so that the stored retained data is retransmitted immediately after the LEA requests the retained data.

Referring to FIG. 5, the electronic surveillance system according to the first exemplary embodiment of the present invention includes a dedicated storage 430 and an LEA 450.

The dedicated storage 430 is a database that receives and stores the retained data generated while a communication service provider 410 performs electronic surveillance on a subscriber. Here, as shown in FIG. 5, the dedicated storage 430 may receive and store the retained data respectively from a plurality of communication service providers 410.

Furthermore, when surveillance information on the specific subscriber is requested from the LEA 450, the dedicated storage 430 provides the LEA 450 with the surveillance information on the specific subscriber selected from the retained data provided by the plurality of communication service providers 410.

In this case, the dedicated storage 430 may receive electronic surveillance information on the specific subscriber requested by the LEA 450 and may respond to the request for the electronic surveillance information on the specific subscriber through a handover interface A (HI-A).

In addition, the dedicated storage 430 may provide the electronic surveillance information on the specific subscriber requested by the LEA 450 through a handover interface B (HI-B).

Here, HI-A and HI-B are each a communication electronic surveillance standard enacted by a lawful interception (hereinafter referred to as L.I.) sector within the European Telecommunication Standard Institute (ETSI). Detailed descriptions thereof will be omitted in the exemplary embodiment of the present invention.

The LEA 450 is a terminal of an organization that requests electronic surveillance on the specific subscriber who uses a communication service. When the electronic surveillance on the specific subscriber is required, the LEA 450 requests the electronic surveillance to the dedicated storage 430.

Figure 6:
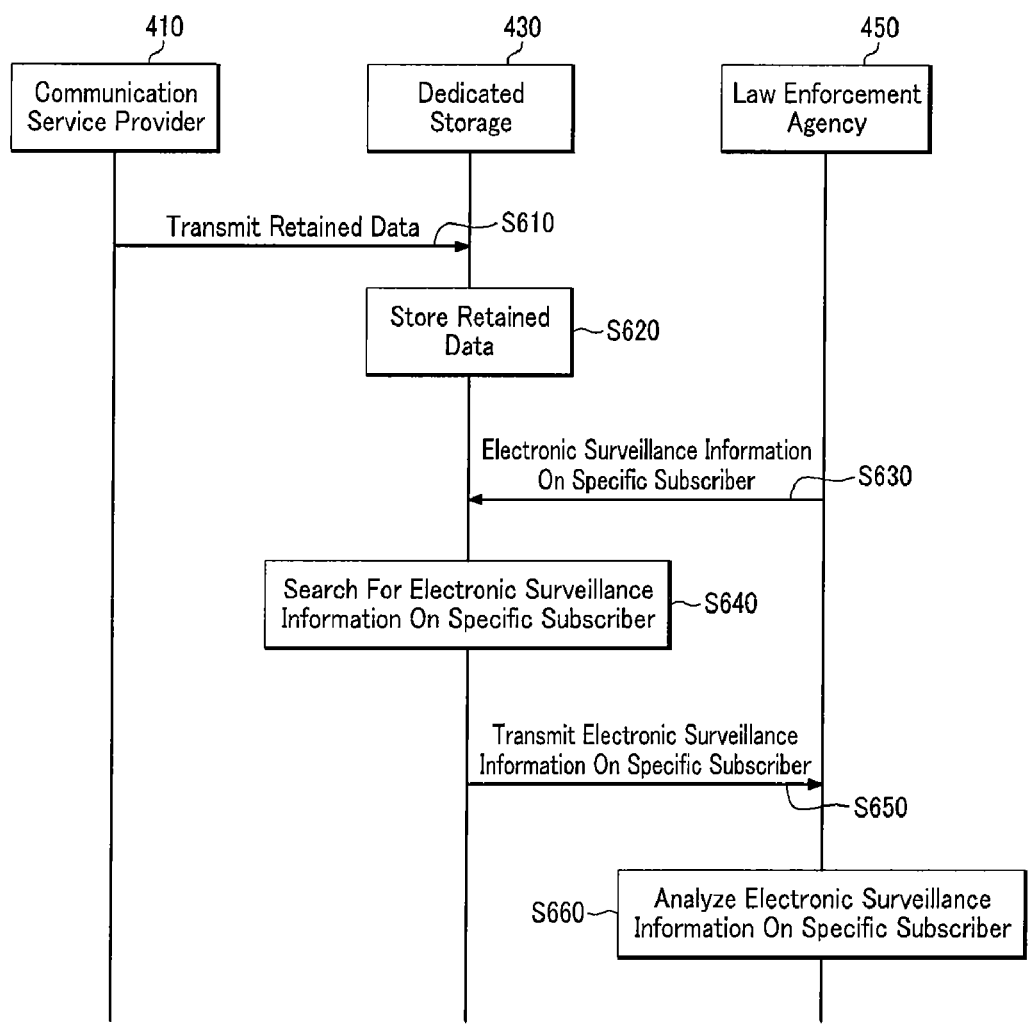
FIG. 6 is a flowchart illustrating an electronic surveillance process performed in the electronic surveillance system according to the first exemplary embodiment of the present invention.

FIG. 6 is a flowchart illustrating an electronic surveillance process performed in the electronic surveillance system according to the first exemplary embodiment of the present invention. Now, the electronic surveillance process according to the first exemplary embodiment of the present invention will be described with reference to FIG. 6.

First, the communication service provider 410 transmits the retained data that is electronic surveillance information on a subscriber to the dedicated storage 430 (step S610). Then, the dedicated storage 430 stores the received retained data in an internal database (step S620).

Next, the dedicated storage 430 receives from the LEA 450 a request of the surveillance information on the specific subscriber (step S620). Then, the dedicated storage 430 searches for the surveillance information on the specific subscriber requested by the LEA 450 from the internally stored retained data (step S640).

Next, the dedicated storage 430 transmits the found surveillance information on the specific subscriber to the LEA 450 (step S650), and the LEA 450 analyzes the received surveillance information and uses it to perform law enforcement (step S660).

Figure 7:
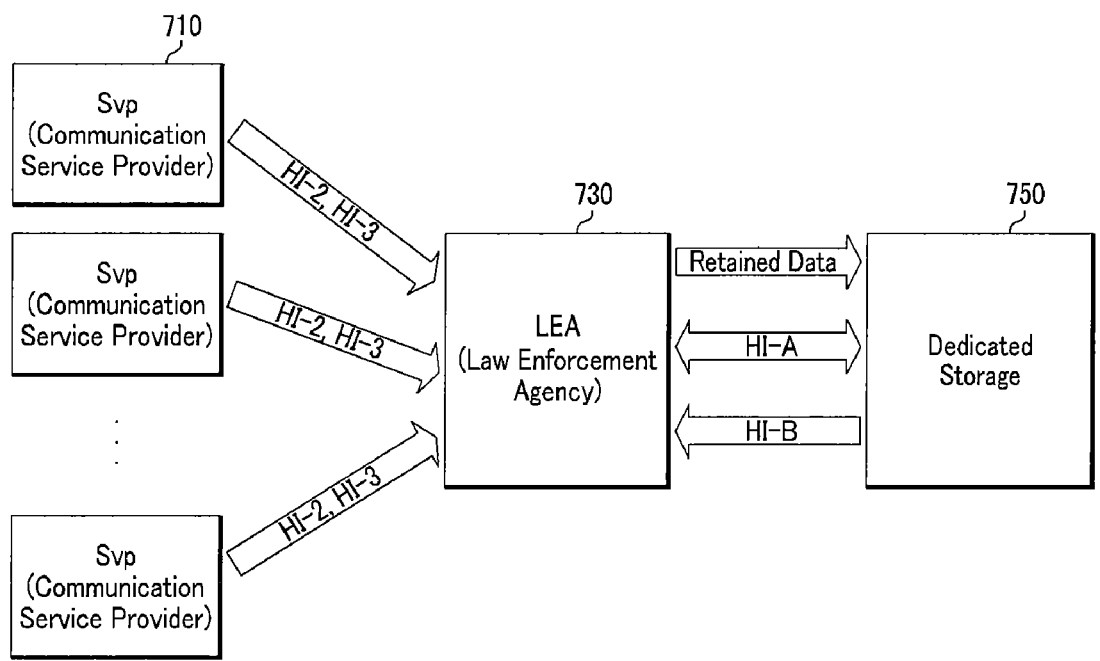
FIG. 7 is a schematic view illustrating a handover structure of retained data between a plurality of communication service providers and an LEA according to a second exemplary embodiment of the present invention.

FIG. 7 is a schematic view illustrating a handover structure of retained data between a plurality of communication service providers and an LEA according to a second exemplary embodiment of the present invention.

An LEA 730 is a terminal of an organization that performs electronic surveillance on a specific subscriber who uses a communication service. The LEA 730 receives retained data that is electronic surveillance information on a plurality of subscribers from a plurality of communication service providers 710. In this case, the LEA 730 may receive the retained data from the communication service providers 710 through a handover interface 2 (HI-2) or a handover interface 3 (HI-3).

Here, HI-2 and HI-3 are each a handover interface between a communication service provider and an LEA defined by the ETSI. Detailed descriptions thereof will be omitted in the exemplary embodiment of the present invention.

Furthermore, the LEA 730 analyzes the received retained data and transmits the retained data that is expected to be required again in the future to a dedicated storage 750. When the LEA 730 needs the electronic surveillance information on the specific subscriber, the LEA 730 requests it from the dedicated storage 750.

The dedicated storage 750 is a database that stores the retained data transmitted by the LEA 730. When the electronic surveillance information on the specific subscriber is requested by the LEA 730, the surveillance information corresponding to the stored retained data is searched for and provided to the LEA 730.

The handover interface between the law enforcement storage 730 and the dedicated storage 750 is the same as in the first exemplary embodiment of the present invention. Thus, detailed descriptions thereof will be omitted.

Figure 8:
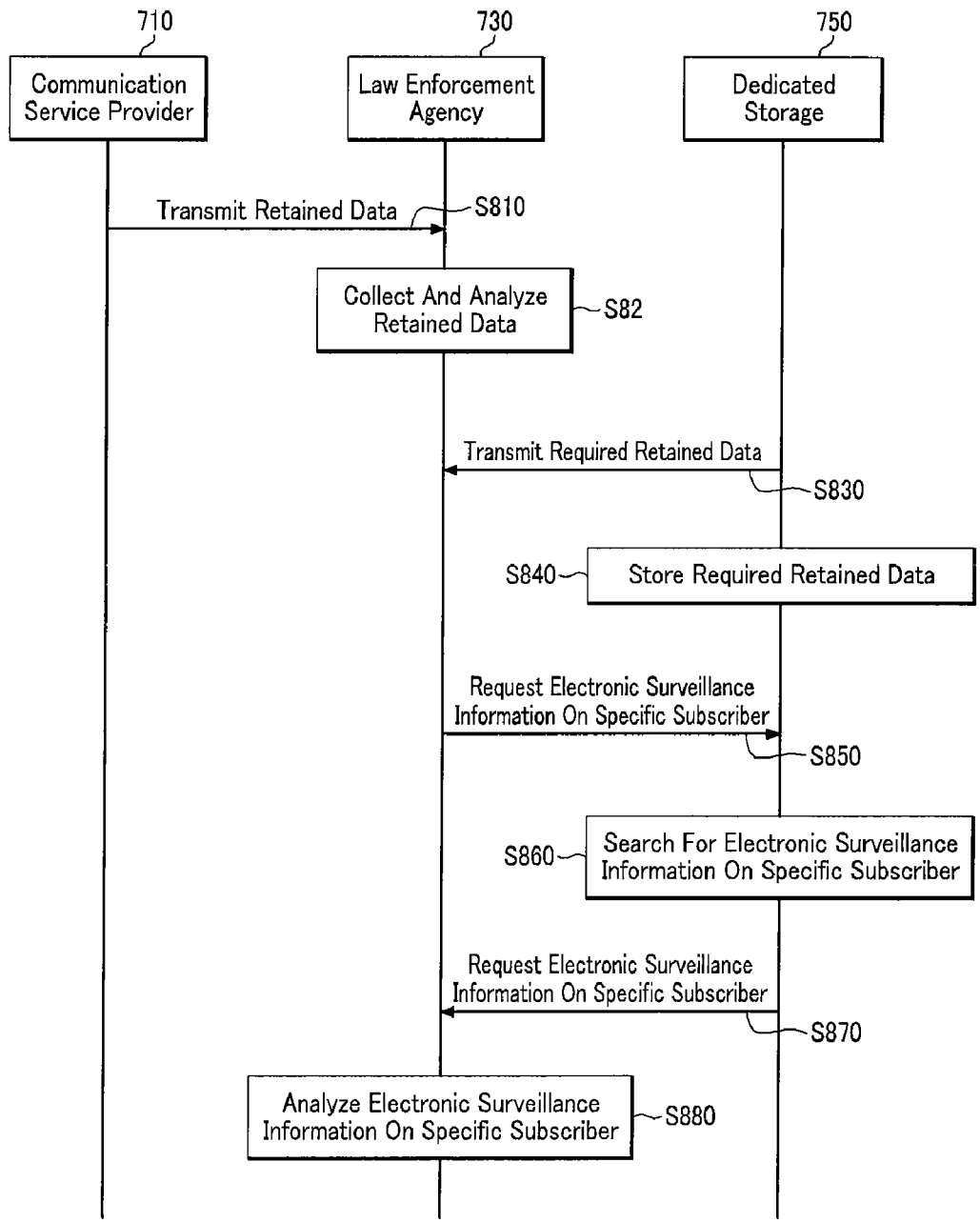
FIG. 8 is a flowchart illustrating an electronic surveillance process performed in the electronic surveillance system according to the second exemplary embodiment of the present invention.

FIG. 8 is a flowchart illustrating an electronic surveillance process performed in the electronic surveillance system according to the second exemplary embodiment of the present invention.

First, the plurality of communication service providers 710 transmit retained data, which is electronic surveillance information for a plurality of subscribers, to the LEA 730 (step S810). Then, the LEA 730 collects and analyzes the received retained data (step S820).

Next, the LEA 730 collects required retained data by collecting and analyzing the electronic surveillance information and transmits the collected retained data to the dedicated storage 750. The dedicated storage 750 stores the received retained data in the internal database (step S840).

Next, the dedicated storage 750 receives from the LEA 730 a request for the electronic surveillance information on the specific subscriber (step S850), and then the dedicated storage 750 searches for the electronic surveillance information on the specific subscriber requested by the LEA 730 from among the internally stored retained data (step S860).

Next, the dedicated storage 750 transmits the found electronic surveillance information on the specific subscriber to the LEA 730 (step S870), and the LEA 730 analyzes the received surveillance information and uses it to perform law enforcement (step S880).

Exemplary embodiments of the present invention can be implemented not only through the aforementioned method and apparatus but also through computer programs executing functions in association with the structures of the exemplary embodiments of the present invention or through a computer readable recording medium having embodied thereon the computer programs. The present invention can be easily implemented by those skilled in the art by using the above descriptions according to the exemplary embodiments.

According to the present invention, retained data that is subscriber electronic surveillance information is integrally managed and stored in a dedicated storage. Thus, a communication service provider can reduce costs when a law enforcement agency requests the subscriber electronic surveillance information. Furthermore, the subscriber electronic surveillance information can be efficiently managed.

In addition, since the electronic surveillance information is managed by and stored in a separate dedicated storage, small-sized communication providers or Internet service providers (ISPs) can actively participate in electronic surveillance.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for an electronic surveillance system to perform electronic surveillance on a subscriber in a communication network, the method comprising:

receiving, from at least one communication service provider, retained data including subscriber information, the retained data being information generated while subscribers use communication services of the communication service provider;

classifying and storing the retained data provided by the communication service provider; and searching the retained data for retained data on a specific subscriber when a request for the retained data on the specific subscriber is received from an electronic surveillance requestor that includes a law enforcement agency, and providing the results of the searching the retained data to the electronic surveillance requestor.

2. The method of claim 1, wherein the providing the results of the searching the retained data comprises receiving a message related to the request for the retained data on the specific subscriber from the electronic surveillance requestor through an interface that supports a handover interface A (HI-A).

3. The method of claim 1, wherein the results of the searching the retained data is provided to the electronic surveillance requestor through an interface that supports a handover interface B (HI-B).

4. A method for an electronic surveillance system to perform electronic surveillance on a subscriber in a communication network, the method comprising:

receiving, from an electronic surveillance requestor including a law enforcement agency, retained data including subscriber information provided by at least one communication service provider, the retained data being information generated while subscribers use communication services of the communication service provider;

classifying and storing the retained data; and searching the retained data for retained data on a specific subscriber when a request for the retained data on the specific subscriber is received from the electronic surveillance requestor, and providing the results of searching the retained data to the electronic surveillance requestor.

5. The method of claim 4, further comprising:

receiving, by the electronic surveillance requestor, from at least one communication service provider, the retained data including subscriber information; and analyzing the retained data, and providing the retained data to the electronic surveillance system based on a result of the analyzing.

6. The method of claim 4, wherein the providing the results of searching the retained data comprises receiving a message related to the request for the retained data on the specific subscriber from the electronic surveillance requestor through an interface that supports a handover interface A (HI-A).

7. The method of claim 4, wherein the results of searching the retained data is provided to the electronic surveillance requestor through an interface that supports a handover interface B (HI-B).

8. An electronic surveillance system for performing electronic surveillance on a subscriber that uses a communication service, the system comprising:

a law enforcement agency configured to receive, from at least one communication service provider, retained data including subscriber information, analyze, and classify the retained data, the retained data being information generated while subscribers use communication services of the communication service provider; and a dedicated storage unit configured to receive the retained data from the law enforcement agency, store the received retained data, search the retained data for retained data on a specific subscriber when the law enforcement agency requests the retained data on the specific subscriber, and provide the results of searching the retained data to the law enforcement agency.

9. The electronic surveillance system of claim 8, wherein the law enforcement agency transmits a message related to a request for the retained data on the specific subscriber to the dedicated storage unit through an interface that supports a handover interface A (HI-A).

10. The electronic surveillance system of claim 8, wherein the dedicated storage unit transmits the results of searching the retained data to the law enforcement agency through an interface that supports a handover interface B (HI-B).

* * * * *